United States Patent [19]

Streib

[11] 4,433,329

[45] Feb. 21, 1984

[54] ULTRASENSITIVE APPARATUS AND METHOD FOR DETECTING CHANGE IN FLUID FLOW DURING THE OCCURRENCE OF A TRANSIENT CONDITION

[75] Inventor: Stephen F. Streib, Novato, Calif.

[73] Assignee: Chevron Research Company, San Francisco, Calif.

[21] Appl. No.: 184,559

[22] Filed: Sep. 5, 1980

[51] Int. Cl.³ .................... G08B 21/00; G01K 17/00
[52] U.S. Cl. ...................................... 340/606; 374/30
[58] Field of Search ............ 340/606; 73/190 H, 204, 73/195; 374/29, 30

[56] References Cited

U.S. PATENT DOCUMENTS

| | | | |
|---|---|---|---|
| 1,528,383 | 3/1925 | Schmidt | 73/190 H |
| 3,312,966 | 4/1967 | Schaller | 340/606 |
| 3,431,149 | 3/1969 | Webb | 374/29 X |
| 3,767,470 | 10/1973 | Hines | 73/190 H |
| 4,003,250 | 1/1977 | Poppendiek et al. | 73/190 H |
| 4,102,196 | 7/1978 | Holtermann | 73/190 H X |
| 4,198,859 | 4/1980 | Holtermann | 374/30 |

FOREIGN PATENT DOCUMENTS

44368 12/1934 France .................................. 73/204

*Primary Examiner*—John W. Caldwell, Sr.
*Assistant Examiner*—Daniel Myer
*Attorney, Agent, or Firm*—H. D. Messner; Edward J. Keeling

[57] ABSTRACT

Transient change in heat flux due to a small variation in flow conditions (say from no flow-to-flow or vice versa) within a fluid-carrying body under a variety of conditions, is indicated. Ultrasensitivity is achieved by cascading the signal output of a plurality of N thermocouples (i.e., a thermopile), attached to upper and lower metallic plates of a heat flux transducer-meter, the upper plate being in heat transfer contact with at least a sector of the previously-mentioned fluid-carrying body. In a preferred case, N is about 80 but can be as high as 320, if desired. Recordation of the output signals is via a recorder, although use of an audio-alarm to immediately alert an operator of a change in flow conditions, contemplated.

11 Claims, 6 Drawing Figures

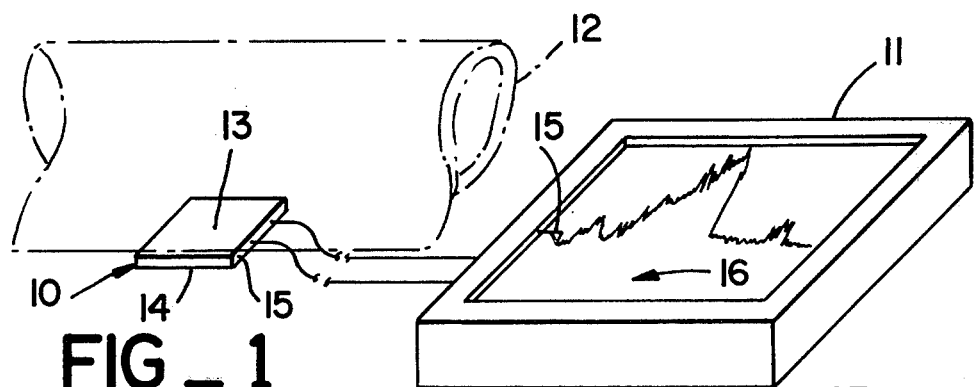
FIG_1
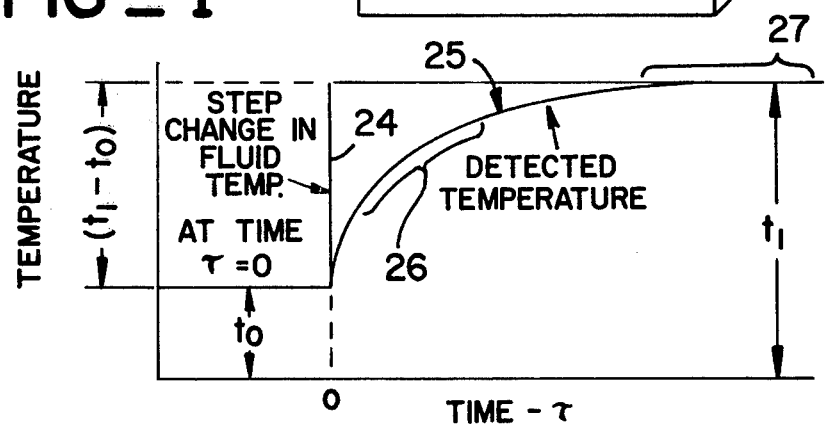
FIG_6
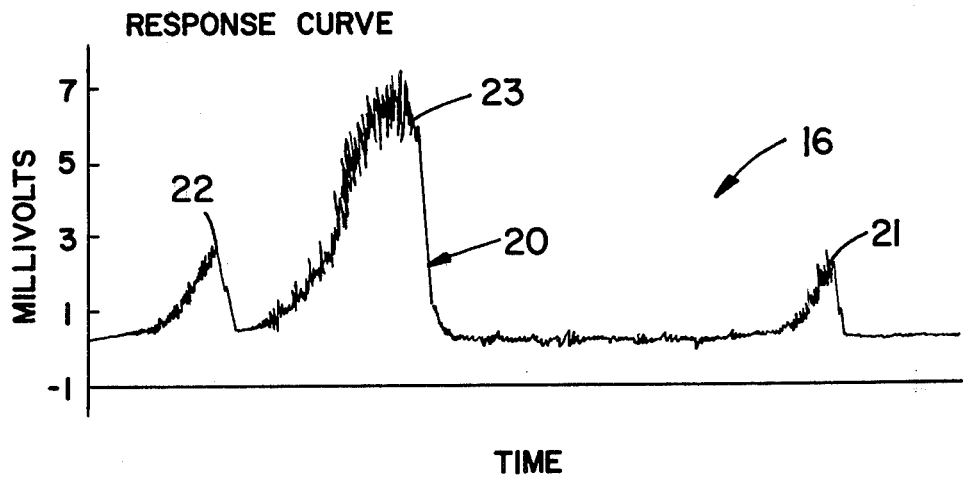
FIG_2

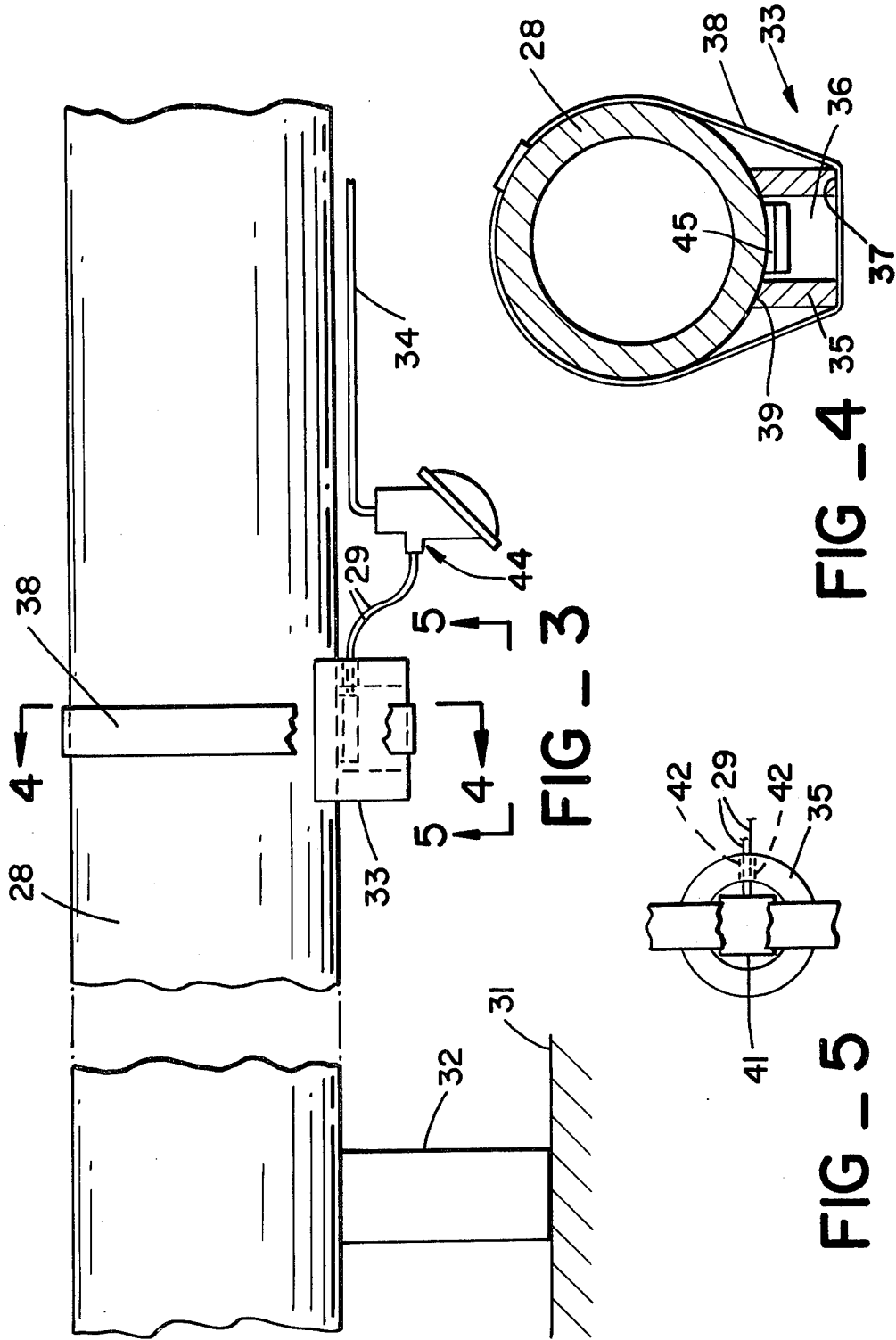

ULTRASENSITIVE APPARATUS AND METHOD FOR DETECTING CHANGE IN FLUID FLOW DURING THE OCCURRENCE OF A TRANSIENT CONDITION

SCOPE OF THE INVENTION

This invention relates to an ultrasensitive but inexpensive apparatus and method for sensing small changes in heat flux due to corresponding low flows of fluid within a body under varying conditions, especially a transient condition in which such fluid flow unexpectedly occurs.

RELATED APPLICATIONS

My following applications, filed simultaneously herewith, are incorporated by reference:

(i) "Ultrasensitive Method and Apparatus for Detecting Change in Fluid Flow Conditions in Relief Flowlines Associated with a Chemical or Refinery Complex" Ser. No. 184,560, filed Sept. 5, 1980; and (ii) "Ultrasensitive Apparatus and Method for Detecting Change in Fluid Flow Conditions in a Flowline of a Producing Oil Well, or the Like" Ser. No. 184,558, filed Sept. 9, 1980.

BACKGROUND OF THE INVENTION

The art of detection of fluid flow is replete with different classifications of inventions indexed for different purposes, say based on type of use involved versus their principles of operation. While detection of change in flow of fluids (under flow/no-flow conditions) using transient heat transfer principles may have occurred, I am unaware of any detector or method which has cascaded the output effect to detect an ultrasmall change in flow conditions under a variety of occurrences, especially say from a heat sensing position completely exterior of the fluid-carrying body while maintaining the integrity of the body intact, i.e., without providing openings through the body itself.

SUMMARY OF THE INVENTION

In accordance with the present invention, transient change in heat flux due to a small variation in flow conditions (say from no-flow to flow or vice versa) within a fluid-carrying body under a variety of conditions is surprisingly indicated. In an apparatus aspect, the change in heat flux due to flow of fluid (either in gas or liquid phase or both) is detected via a heat flux transducer-meter in heat transfer contact with but exterior of the fluid-containing body under survey. Minimization of background signal level is achieved by surrounding the transducer-meter with a weathering bonnet attached to the body under survey by a strap. Ultrasensitivity is achieved by cascading the signal output of a plurality of N thermocouples comprising a thermopile attached to upper and lower thin metallic plates. (In a preferred embodiment N is about 80 but can be as high as 320 if desired.) The upper plate is placed in heat transfer contact with at least a sector of the previously mentioned fluid-carrying body say at its underside relative to gravity. In the method aspect of the present invention, performance is further enhanced by attaching the upper metallic plate of the transducer-meter to the fluid-containing body via a heat conducting adhesive having a high thermal conductivity value. Result: background signal level is further reduced. Cascading the signal output then can provide sensitivities of say from 7 to 250 Btu/hr/ft$^2$ per millivolt output. Recordation of the output signals is via a recorder, although use of an audio alarm to immediately alert an operator of a change in flow condition, is contemplated.

DESCRIPTION OF THE DRAWINGS

FIG. 1 is a perspective view of a heat-flux indicating transducer-meter of the present invention (i) electrically connected to a recorder but (ii) physically connected to a fluid-carrying body undergoing survey, in accordance with the present invention;

FIG. 2 is an actual plot of the signal output of the transducer-meter and recorder of FIG. 1 (versus time);

FIG. 3 is a side elevational view of a fluid-carrying pipeline supporting an improved form of the transducer-meter of FIG. 1;

FIG. 4 is a sectional view taking along line 4—4 of FIG. 3;

FIG. 5 is a detail view of the transducer-meter, taken in the direction of line 5—5 of FIG. 3;

FIG. 6 illustrates the transient character of the signal output of the transducer-meter of the present invention.

DESCRIPTION OF PREFERRED EMBODIMENTS OF THE INVENTION

Reference should now be had to FIG. 1, illustrating apparatus and method aspects of the present invention.

As shown, a heat flux transducer-meter 10 of the present invention is serially connected to a recorder 11. The purpose of the combination: To detect and indicate ultrasmall change in fluid flow within a fluid-carrying body such as flowline 12, shown in phantom in FIG. 1, especially during the occurrence of a transient condition such as the occasion of a change in fluid flow within the body 12 from a no-flow to flow condition.

(By the term "transient" not only should the reader envision the typical thermal conditions or circumstances that term describes, but also should conceive of external circumstances such as where rain, humidity and wind, for example, would combine to bring about such a state. The transducer-meter 10 of the present invention is contemplated as being located out-of-doors; hence, such environmental factors are of importance.)

In operation, the transducer-meter 10 acts as a heat probe. Its sensitivity, however, is unaffected by its small size. Even though dimensions of the exterior metallic surface plates 13 and 14 are preferably roughly 1 inch by 1 inch, sensitivies of the transducer-meter are of the range of at least 7 Btu/hr/ft$^2$ per millivolt output are conventional. The plates 13 and 14 are usually separated by an insulating board 15 onto which a plurality of N thermocouples can be etched using conventional solid state manufacturing techniques. Their termini connect with thin metallic layers or plates 13 and 14; so their outputs are cascaded, in series thermopile fashion whereby the sum of the cascaded output appears at recorder 11 as a solid state generated, temperature equatable, millivolt output. Additionally, the transducer-meter 10 has surprising sensitivity because of the cascading of the outputs of the plurality of thermocouples. At the recorder 11 (which can be potentiometric type recorder) the cascaded output can be accurately displayed relative to a calibrated setpoint level using a servo operated voltage balancing circuit in conjunction with a null-balancing circuit so as to surprisingly indicate heat flow within the fluid-carrying body under survey, as a function of time.

However, in the application depicted note that the upper plate 13 is placed in surface-to-surface contact over a sector of the underside of flowline 12, although the sector involved may be exceedingly small. Signal output of transducer-meter 10 itself is a function of size; for example, for a plate 13–14 having dimensions 1 inch by 1 inch N is equal to 80, i.e., there are 80 thermocouples between the plates 13–14; while a plate having the dimensions 2 inches by 2 inches has 360 thermocouples in contact therewith. Hence, signal output is directly proportional to plate size. However, thermal resistance introduced by either combination is negligible. Furthermore, no power supply is needed for operation of the transducer-meter 10 of the present invention since the latter operate on the thermopile principle.

OPERATIONS

Operation of the flux transducer-meter in the present invention is a somewhat conventional application of thermopile principles in which temperature differences (delta-T) between plates 13 and 14 connecting to a plurality of thermocouples in combination generate a potential signal proportionate to delta-T. That is to say, both plates 13 and 14 and the plurality of N thermocouples form elements of the aforementioned thermopile circuit. Result: A surprisingly sensitive millivolt output is produced proportional to the heat flux passing through the transducer-meter 10 as a direct function of change in fluid flow within the flowline 12 (either in gas or liquid phase, or both).

Calibration of the transducer-meter 10 is required, and usually each meter 10 is provided with a separate calibration curve and temperature correction curve. In this regard a particular adaptable transducer-meter 10, including useful calibration and correction curves, is manufactured by International Thermal Instrument Company, Del Mar, Calif., to the following specification:

| | |
|---|---|
| Temperature range | −425° F. to 550° F. |
| Material | Polyimide-glasses |
| Max Flux Density | $10^6$ BTU/Hr Ft$^2$ |
| Time Constant | 1 Second (Approx) |
| Output Resistance | 30 Ohms to 500 Ohms |
| Sizes | $\frac{1}{4}'' \times \frac{1}{4}''$ to $4'' \times 4''$ |
| Accuracies | 10% to 1% |
| Sensitivities | 7 to 250 BTU/Hr/Ft$^2$/Mv |

To provide a permanent record for operator perusal, the recorder 11 includes a mechanically driven stylus 15 which charts amplitude as a function of time on graph 16, i.e., the recorder 11 records the ganged signal outputs from the tranducer-meter 10 as a function of time.

Graph 16 is shown in detail in FIG. 2.

Note in FIG. 2 that curve 20 charts output signal level from the tranducer-meter 10 in an actual application, as a function of time (in hours). In the application shown, medium peaks 21 and 22 occur early and late, respectively, in the depicted monitoring cycle, while large peak 23 occurs during the middle of the same cycle.

Each peak 21, 22 or 23 signifies that flow of fluids had occurred within the flowline under survey (where the particular transducer-meter 10 had been attached) over the period of time designated. Slopes of the peaks 21, 22 or 23 are also of interest. Since they vary rather slowly with time, they indiate that heat flow proportional to fluid flow was in a transient mode as opposed to a steady state condition. (That is to say, temperatures associated with fluid flow vary rather slowly with time over the periods of interest at the boundaries of interest.)

Where the temperatures of the interior boundary of the body 12, for example, abruptly change (as by the occurrence of fluid flow within the flowline 12 so that a temperature difference that previously existed there occurs), there is a period of adjustment in the temperature (see FIG. 6). During this period, the fluid within the body 12 undergoes a step change 24, as shown, while temperature existing at the boundary of the body 12 itself in the vicinity of the transducer-meter 10 undergoes a slower change, as along curve 25 of FIG. 6. Note that since in most applications the periodicity of the fluid flow is irregular, the length of time of fluid flow is unpredictable, and there are variables external to the body 12 itself, operations within the knee 26 of the curve 25 is rather a common occurrence. That is to say the transducer-meter 10 operates in a transient mode see pages 275–277 "Principles of Engineering Heat Transfer", Warren H. Giedt, Van Nostrand Company, Inc., Princeton, N.J. 195.

But in some cases the temperature of the body 12 at the above-identified boundary can correspond to the fluid itself. Hence operation would be within region 27 of the curve 25.

FIG. 3 illustrates the present invention in still more detail.

As shown, transducer-meter 10 has been improved whereby it can operate in field applications with greater efficiency, such as in a location adjacent to a pipeline 28 remote from a central location (not shown). Note that in the depicted operation, the associated recorder or alarm circuit is not pictured. However, the latter is electrically connected to the transducer-meter 10 via conductors 29. Centrally locating a plurality of recorder and/or alarm circuits in electrical connection with a multiplicity of improved transducer-meters 10 allows a single operator (at the central location) to monitor flow conditions of several branches of a flowline simultaneously. The type of flow condition that is individually monitored, however, varies with the application involved.

For example, in FIG. 3 the pipeline 28 is seen to be elevated above ground surface 31 via the conventional pipe support 32. Also supported above ground surface 31 on the pipeline 28 is shielding bonnet 33 (placed about the transducer-meter 10) as well as conduit 34, in which conductors 29 are located.

FIGS. 4 and 5 illustrate bonnet 33 in more detail.

As shown in FIG. 4, bonnet 33 is cylindrical and includes a sidewall 35 forming a cavity 36 open at endwall 37 beneath the pipeline 28 but closed at its opposite end in contact with pipeline 28. Strap 28, circumferentially stretching about the pipeline 28 semipermanently supports the bonnet 33 relative to the pipeline 38.

Since it is desirable to have a large thermal resistance at its contact surface with the pipeline 28, boundary 39 of the bonnet 33 can be gnarled to increase the number of air spaces in the plane of the endwall.

To avoid further thermal interference with the transducer-meter 10 of the present invention, the bonnet 33 is also centered about the former (but avoids direct metal-to-metal contact therewith) by having a somewhat annular air space 41 therebetween, see FIG. 5. Sidewall 35 of the bonnet 33 is also provided with openings 42, through which the electrical conductors 29 extend, see FIG. 5. These electrically connect the transducer-meter 10 with its associated recorder and/or alarm circuit, as previously discussed.

The size of the openings 42 can be enlarged to fit snugly about the conductors 29 if desired. In that way, rain, moisture, or other environmental factors can be somewhat inhibited from directly contacting the transducer-meter 10 of the present invention, during operations thereof. Hence, the latter's operations remain stable once calibration has occurred and its background signal level correspondingly remains at a minimum level.

Note also that the conductors 29 can include a receptacle 44 (FIG. 3) so as to allow easy relocation of the bonnet-transducer assembly from place to place along the pipeline 28, as required. At the other end of the receptacle 44 is the ultimate destination of the conductors 29: The system recorder and/or alarm circuit previously mentioned.

In order to further minimize background noise level, the transducer-meter 10 of the present invention must be firmly attached to the pipeline 28. In this regard a conventional heat conductor adhesive 45 (see FIG. 4) having a high conductivity value such as between 15–20 Btu's per hour per degree (F) per square foot per inch of thickness can be used. In this regard, an adhesive manufactured by Thermon Manufacturing Company, San Marcus, Tex., under the trade name "Thermon" has proven adequate in all applications.

Although the invention has been described in terms of specific embodiments set forth in detail, it should be understood that such description is by way of illustration only and the invention is not necessarily limited thereto since alternatives will be readily apparent to those skilled in the art, but rather by the scope of the following claims.

What is claimed is:

1. Method of providing detection of change of fluid flow within a fluid-carrying body from a location completely exterior thereof, while maintaining the integrity of the interior of the body intact comprising:
    (a) positioning a heat flux sensing transducer-meter exterior of but in heat conducting contact with the exterior of said body;
    (b) monitoring change in fluid flow interior of said body by generating a transient cascaded output signal proportional to transient variation in heat flux detected exterior of said body at said transducer-meter;
    (c) indicating at least said transient cascaded output signal as a function of time.

2. Method of claim 1 in which said step (a) of positioning said heat flux sensing transducer-meter exterior of said body includes:
    (i) bonding one of two sides of said transducer-meter to a sector of said body using an adhesive having a high thermal conductivity value wherein minute fluid flow at the interior of said sector is easily detected and whereby said transient variation in heat flux is detected only said sector of said body.

3. Method of claim 2 in which thermal conductivity of said adhesive is at least 15 $Btu/hr/ft^2/°F.$ per inch of thickness.

4. Method of claim 2 in which thermal conductivity of said adhesive is in a range of 15–20 $Btu/hr/ft^2/°F.$ per inch of adhesive thickness.

5. Method of claim 1 in which said step of monitoring change in fluid flow includes the precursor step of calibrating output of said transducer-meter to a preselected set-point level whereby deviations therefrom due to change in fluid flow can be detected.

6. Method of claim 1 in which said fluid flow to be detected is in a gas phase.

7. Method of claim 1 in which said fluid flow to be detected is in a liquid phase.

8. Method of claim 1 in which said fluid flow to be detected is in both liquid and gas phases.

9. Method of claim 1 in step (b) is characterized by monitoring a NO-FLOW to a FLOW condition within said at least one flowline.

10. A method of detecting variations in fluid flow in a conduit comprising the steps of positioning a thermopile on the exterior of said conduit and detecting at least the transient signal output from said thermopile proportional to transient heat flux at said thermopile to indicate variations in the flow of a fluid in said conduit.

11. Method of claim 10 in which the step of detecting changes in fluid flow, is characterized in measuring a NO-FLOW to a FLOW condition within said conduit.

* * * * *